(12) United States Patent
Chen

(10) Patent No.: US 7,988,109 B2
(45) Date of Patent: Aug. 2, 2011

(54) FIXING MECHANISM AND A COMPUTER CASING WITH THE FIXING MECHANISM

(75) Inventor: Shwu-Fen Chen, Taipei (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 150 days.

(21) Appl. No.: 12/314,722

(22) Filed: Dec. 16, 2008

(65) Prior Publication Data

US 2009/0294606 A1   Dec. 3, 2009

(30) Foreign Application Priority Data

May 31, 2008   (CN) .......................... 2008 1 0028500

(51) Int. Cl.
*F16M 11/00*   (2006.01)
(52) U.S. Cl. .................. 248/201; 312/223.1; 312/223.2
(58) Field of Classification Search ............... 248/163.1, 248/163.2, 164, 431; 211/26; 108/118, 159; 297/188, 16.2, 451.1; 312/223.1, 223.2
See application file for complete search history.

(56) References Cited

U.S. PATENT DOCUMENTS

| | | | | |
|---|---|---|---|---|
| 3,547,274 A * | 12/1970 | Sosinkski | .................. | 211/89.01 |
| 3,559,813 A * | 2/1971 | Sosinski | .................... | 211/89.01 |
| 3,595,402 A * | 7/1971 | Smaczny | ......................... | 211/26 |
| 5,546,277 A * | 8/1996 | Zandbergen | .................. | 361/726 |
| 6,434,871 B2 * | 8/2002 | Conway | ........................... | 40/651 |
| 6,464,085 B1 * | 10/2002 | Chin et al. | ...................... | 211/26 |
| 7,296,523 B1 * | 11/2007 | Yoon | ............................. | 108/103 |
| 7,495,904 B2 * | 2/2009 | Liang et al. | .............. | 361/679.39 |
| 7,542,281 B2 * | 6/2009 | Liang et al. | .............. | 361/679.39 |
| 2004/0173544 A1 * | 9/2004 | Chen | ................. | 211/26 |
| 2005/0121581 A1 * | 6/2005 | Chen et al. | ................. | 248/316.8 |
| 2005/0205734 A1 * | 9/2005 | Wang | .......................... | 248/276.1 |
| 2005/0274680 A1 * | 12/2005 | Allen et al. | ..................... | 211/26 |
| 2008/0111032 A1 * | 5/2008 | Yang et al. | ................... | 248/68.1 |

* cited by examiner

*Primary Examiner* — Amy J Sterling
*Assistant Examiner* — Erin Smith
(74) *Attorney, Agent, or Firm* — Rosenberg, Klein & Lee

(57) ABSTRACT

A fixing mechanism assembled on brackets of a computer casing. The fixing mechanism includes a main portion; a connecting portion disposed on the main portion, the connecting portion movably connecting to the bracket; at least one restriction portion connecting with the connecting portion; and a switching portion connecting between the connecting portion and the restriction portion; whereby the restriction portion switches from a first position to a second position by the switching portion for supporting hard disk drives with different heights. The fixing mechanism also includes a plurality of tighten means at the other said bracket for fixing the hard disk drive. Therefore, it is convenient for users to accommodate the hard disk drivers with different heights within the computer casing.

20 Claims, 10 Drawing Sheets

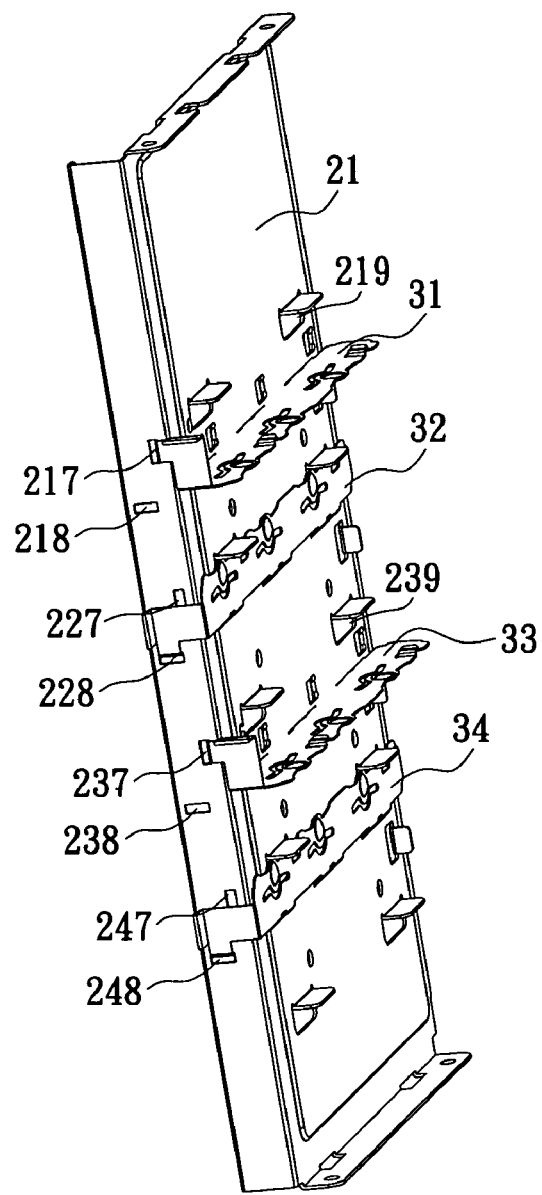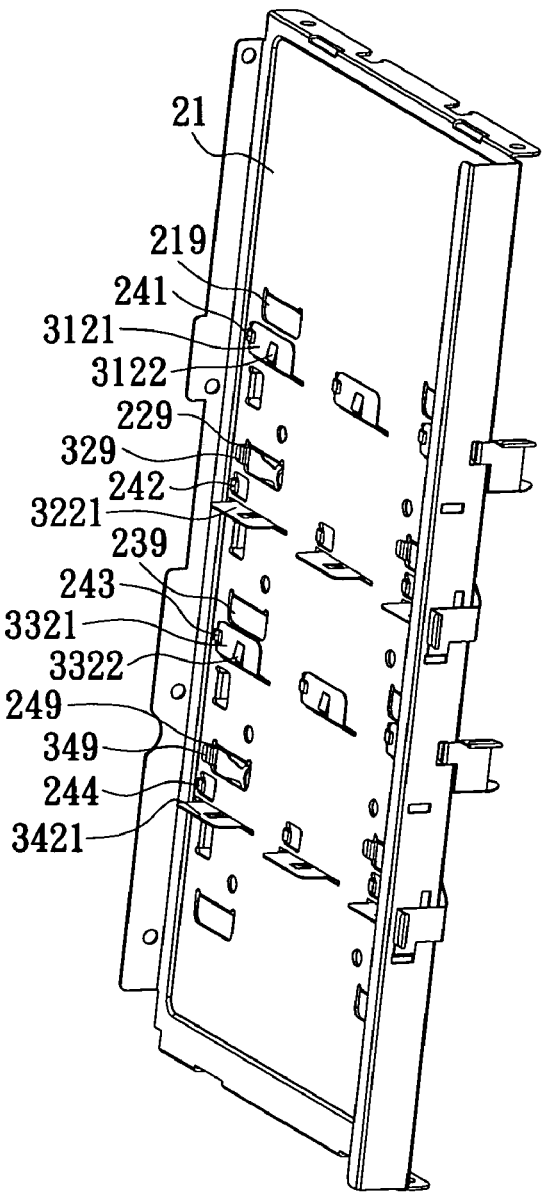
FIG. 9
FIG. 10

FIXING MECHANISM AND A COMPUTER CASING WITH THE FIXING MECHANISM

BACKGROUND OF THE INVENTION

1. Field of the Invention

The present invention relates to a fixing mechanism for a computer casing, and in particular to a fixing mechanism which is used for efficiently assembling/disassembling computer components within the computer casing that has different heights.

2. Description of Related Art

Computers are widely used in many families. With the development of the electronic industry, update of the computer is necessary and manufacturers are devoted to providing the updating service of computer hardware and software for end users. Now, the capacity of the hard disk drive is greater and greater so as to accommodate the increasing amount of growing data. However, the hard disk drives in the market have different sizes because of the different suppliers. It is not convenient for users to assemble the hard disk drive for the reason of the different sizes of the drives or the different assembling means. On the other hand, the moldings used to manufacture the casing are various in regard to the said different assembling means, so that in order to accommodate for these variations the cost of the manufacturing can be not reduced. Additionally, a user has to use specific tool or another installing method for assembling the hard disk drives into the casing.

Thus, a fixing mechanism and a casing with the fixing mechanism now have been developed for assembling/disassembling the computer components efficiently.

Therefore, in view of this, the inventor proposes the present invention to overcome the above problems based on his expert experience and deliberate research.

SUMMARY OF THE INVENTION

The primary object of the present invention provides a fixing mechanism. Computer hardware with different height can be accommodated into the computer casing and the fixing mechanisms are provided for fixing the computer hardware.

In order to achieve the above object, the present invention provides a fixing mechanism assembled on brackets of a computer casing. The fixing mechanism includes a main portion; a connecting portion disposed on the main portion, the connecting portion movably connecting to the bracket; at least one restriction portion connecting with the connecting portion; and a switching portion connecting between the connecting portion and the restriction portion; whereby the restriction portion switches from a first position to a second position via the switching portion so as to support hard disk drives with different heights.

In the embodiment, the switching portion includes a switching axis, and the restriction portion rotates via the switching axis for adjusting the space for higher hard disk drive. The restriction portion has a fixing piece which can be fixed on the bracket so that the fixing mechanism can be fixed on the bracket. The fixing piece protrudes from the restriction plane so that there is space between the fixing piece and the restriction plane. Thus, the space is used for locking the fixing mechanism of the second position (adjusting the height limitation) on the first bracket. The restriction portion disposed nearest to one end of the fixing mechanism has a location hook on that end, and the location hook can hook on the bracket. The restriction portion nearest to the other end of the fixing mechanism has at least one insertion piece which is a rigid element. Each insertion piece has an elastic locking element and the elastic locking element has a connection end and a free end. The connection end connects with the insertion piece and the free end extends from the connection end for protruding out of the installation piece. At least one elastic locking element protrudes from the restriction plane so as to contact and hold the hard disk drive tightly.

A computer casing with the fixing mechanisms are further disclosed. The computer casing can be used for accommodating hard disk drives with different heights.

In the present invention, the computer casing includes two brackets, respectively disposed on two sides of the hard disk drive, wherein each bracket has a plurality of supporting planes for supporting the hard disk drive; a plurality of fixing mechanisms disposed on the two brackets, wherein each fixing mechanism comprises: a main portion; a connecting portion disposed on the main portion, the connecting portion movably connecting to the corresponding bracket; at least one restriction portion connecting with the connecting portion, wherein the restriction portion is used for restricting the height of the hard disk drive; and a switching portion connecting between the connecting portion and the restriction portion, whereby the restriction portion switches from a first position to a second position or form the second position to the first position via the switching portion so as to support hard disk drives with different heights.

The bracket further has a plurality of installation holes in which the connecting portions of the fixing mechanism are inserted. The bracket has fixing portion for fixing the connecting portion of the fixing mechanism inserted in the installation holes. The elastic clamping element (fixing portion) protrudes from the outer surface of the bracket. There is space formed between the elastic clamping element and the outer surface of the bracket for fixing the connecting portion. The bracket has a plurality of location hooking holes, wherein one of the location hooking hole extends vertically (e.g. longitude location hooking hole) while the other location hooking hole extends vertically (e.g. transverse location hooking hole), and these two location hooking holes are used for determining the fixing mechanism in the first or second positions. A restriction portion has a location hook on an end thereof and the location hook can be selectively locked to the two location hooking holes. The computer casing has a covering member which connects to the brackets and the fixing mechanisms. The covering member has a strengthening portion, a longitude strengthening insertion hole and a transverse strengthening insertion hole, which is used for preventing the fixing mechanisms from bending due to stress. The insertion piece which connects to the restriction portion is selectively locked to the two strengthening insertion holes. The connection between the insertion piece and the strengthening insertion hole can prevent the fixing mechanisms from bending due to the stress.

A plurality of fixing mechanisms is used in the present invention. One fixing mechanism has a connecting portion for connecting with the brackets. The fixing mechanism further has a restriction portion for limiting the height of the hard disk drive which is accommodated within the computer casing. A switching portion is formed between the connecting portion and the restriction portion and a switching axis is defined on the switching portion. The restriction portion can rotate via the switching axis for adjusting the space in order to load the taller, higher, or thicker hard disk drive. Alternatively, the restriction portion can rotate on the switching axis for adjusting the space in order to load the shorter, lower, or thinner hard disk drive. Therefore, the hard disk drives with different heights can be accommodated in the same computer casing and the hard disk drives can be tightly held by the fixing mechanisms.

In order to better understand the characteristics and technical contents of the present invention, a detailed description thereof will be made with reference to the accompanying drawings. However, it should be understood that the drawings and the description are illustrative only and are not for limiting the scope of the present invention.

BRIEF DESCRIPTION OF THE DRAWINGS

FIG. 9 is a schematic view showing the fixing mechanism assembled on the bracket and showing the state of the fixing mechanism for accommodating the hard disk drives with different heights.

FIG. 10 is a schematic view with a view angle reverse to the view angle of FIG. 9.

DETAILED DESCRIPTION OF PREFERRED EMBODIMENTS

The present invention provides a fixing mechanism for supporting hardware components such as optical disk drives or hard disk drives. The embodiment takes a hard disk drive as an example hereinafter, but the computer drive can be another element, such as DVD drive and so on. Note that the similar parts of the fixing mechanism are referred with the similar numeral indications.

Figure 1:
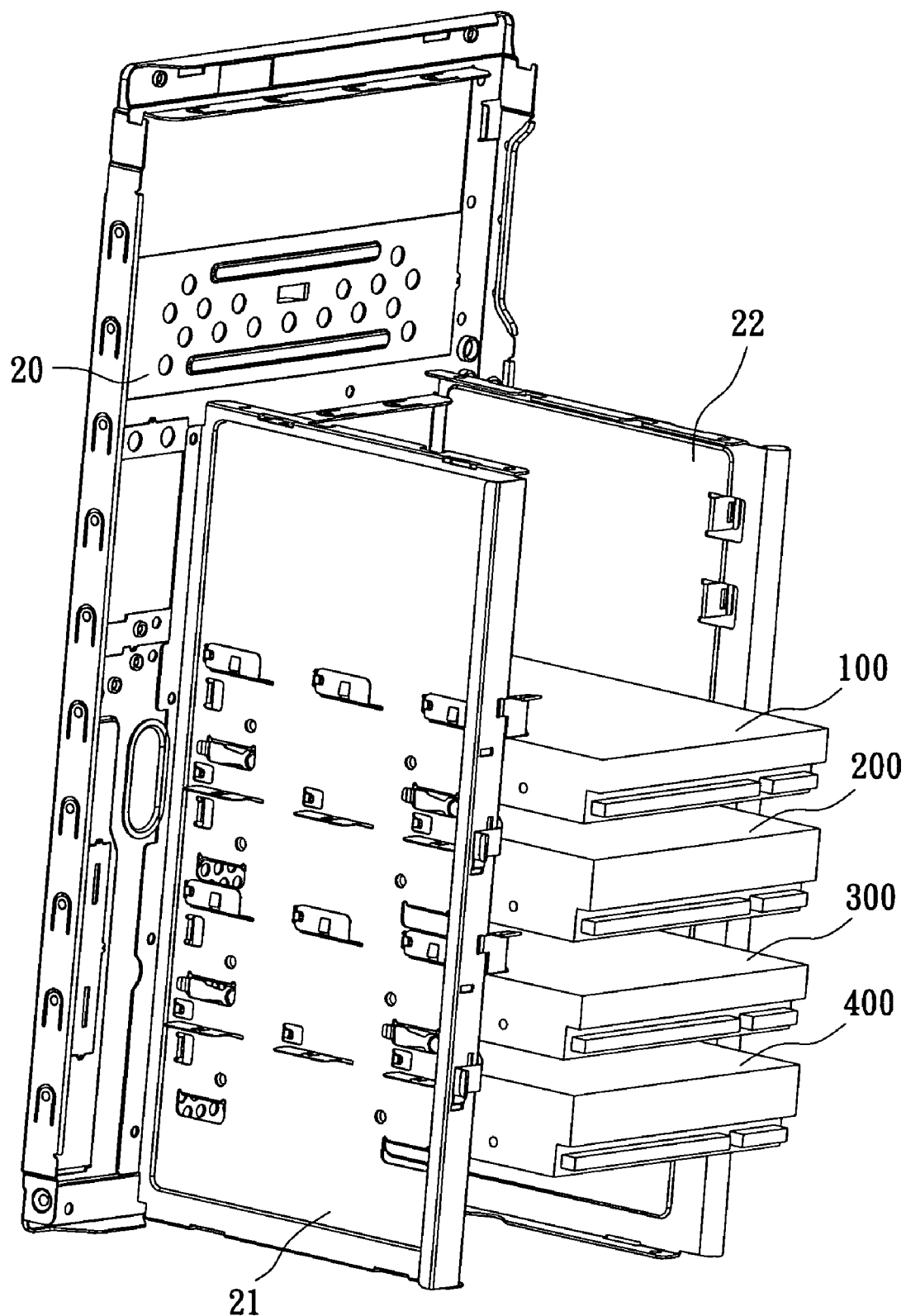
FIG. 1 is a schematic view showing the fixing mechanisms assembled on the computer casing according to the present invention.

Please refer to FIG. 1, wherein FIG. 1 shows the first embodiment of the present invention. The fixing mechanisms are applied for fixing the hard disk drives 100, 200, 300, 400 in the brackets of the computer casing. The computer casing has a first bracket 21, a second bracket 22, and a covering member 20. The first bracket 21 and the second bracket 22 are respectively disposed on the two sides of the covering member 20. A plurality of supporting planes protrudes from the inner surfaces of the first bracket 21 and the second bracket 22 and the supporting planes on the first bracket 21 are corresponding to that on the second bracket 22. The corresponding supporting planes 211, 212, 213, 214 on the first bracket 21 and the second bracket 22 are used for supporting computer hard disk drives 100, 200, 300, 400 respectively.

Figure 2:
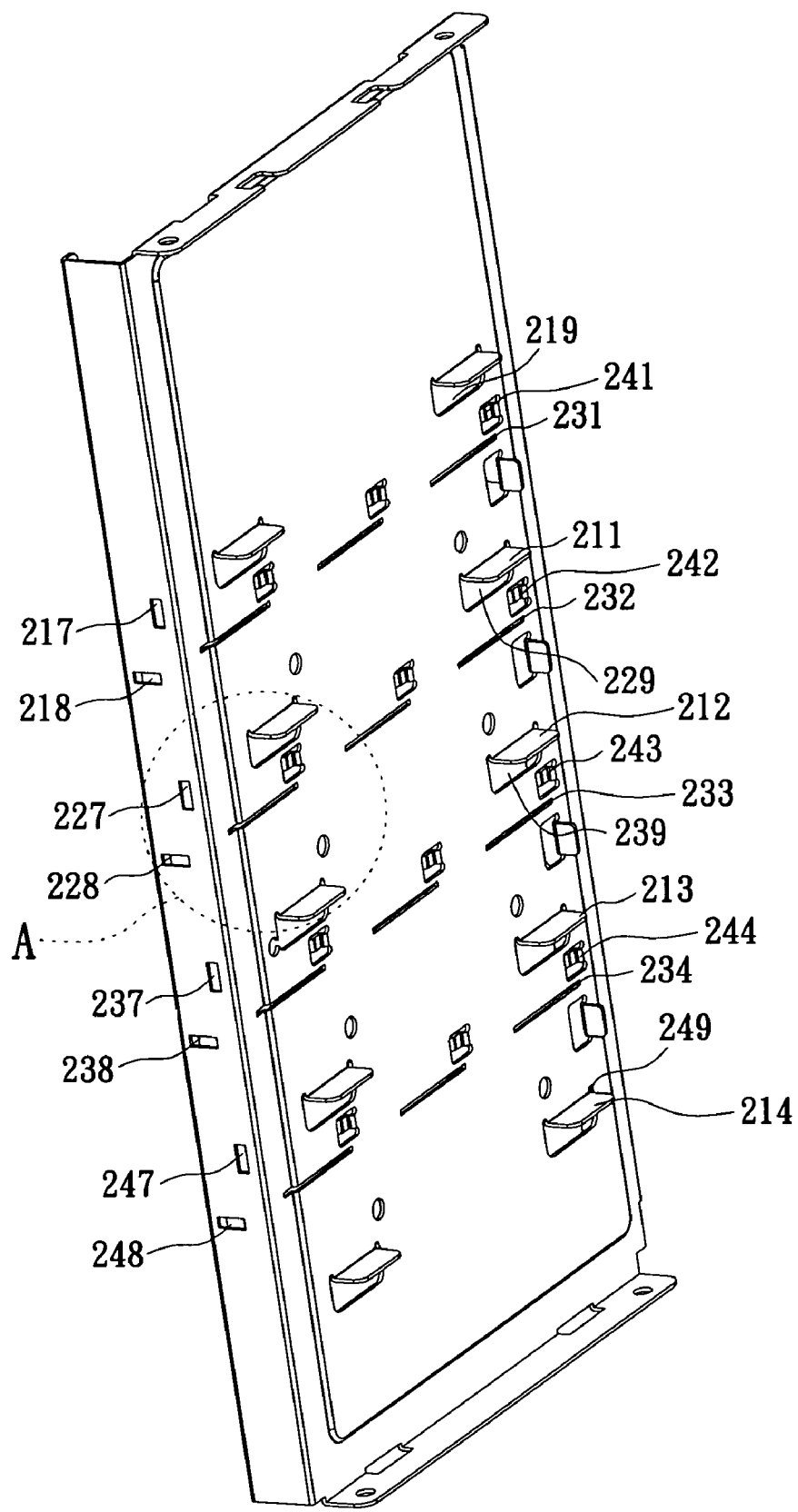
FIG. 2 is a schematic view showing the first bracket according to the present invention.
Figure 3:
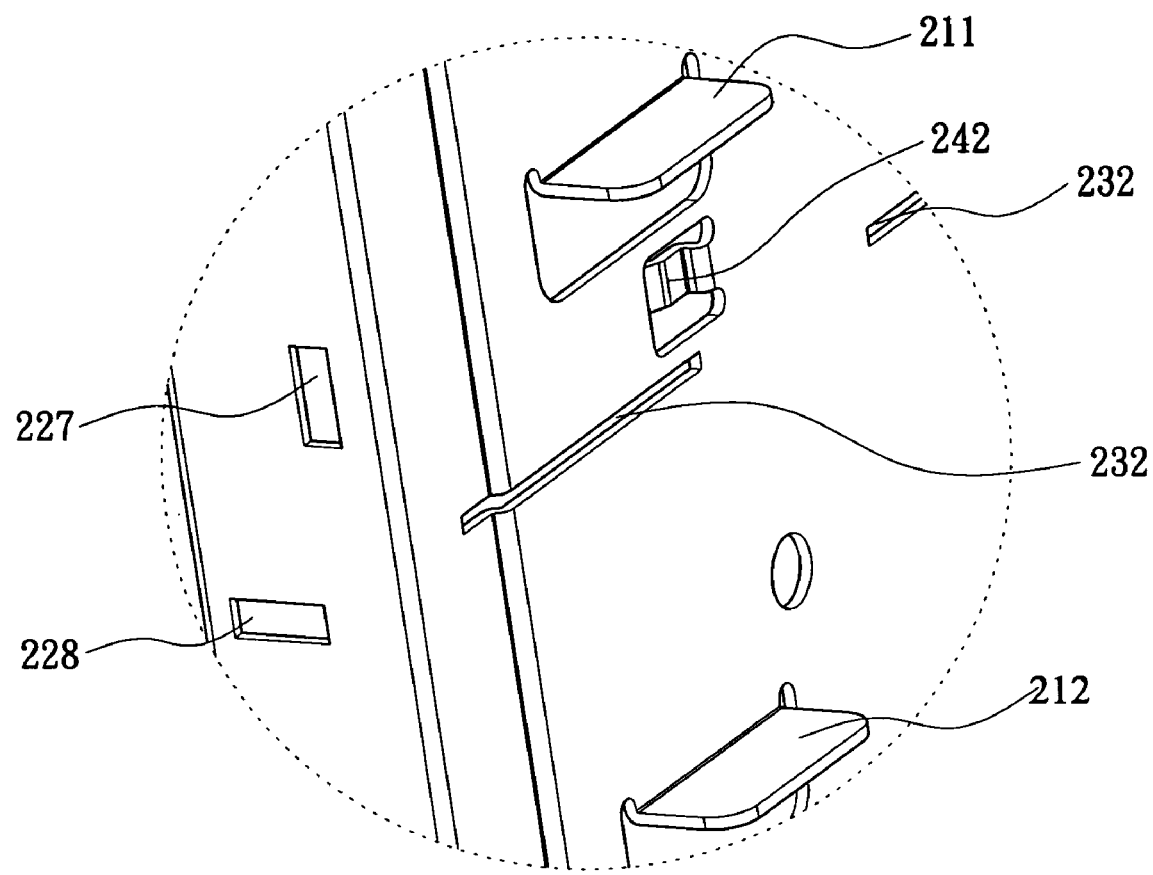
FIG. 3 is an enlarged representation showing the A portion of FIG. 2 according to the present invention.
Figure 4:
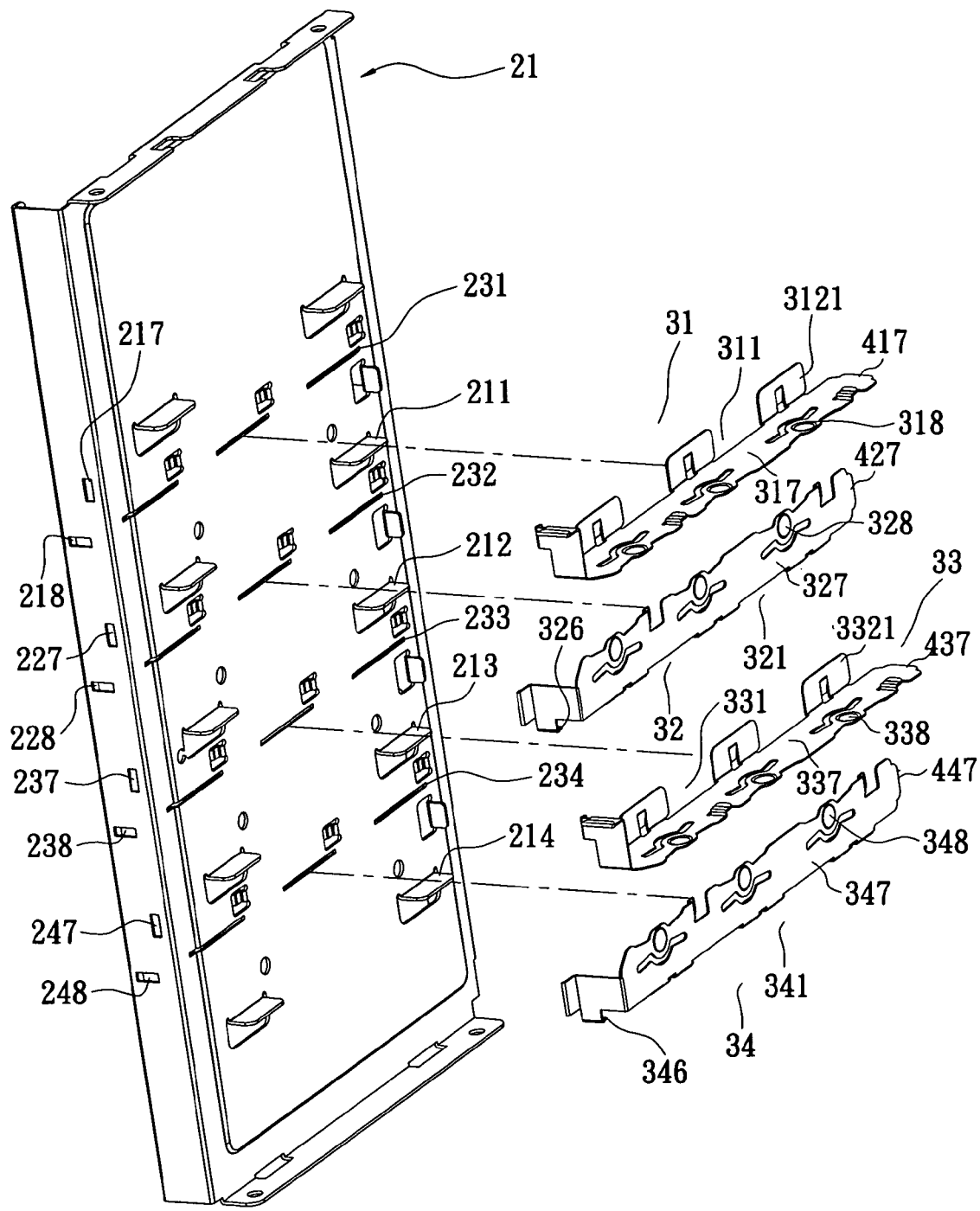
FIG. 4 is a schematic view showing the fixing mechanism disassembled with the first bracket according to the present invention.

Please refer to FIGS. 2-4, there are four lines of the supporting planes in different levels on the first bracket 21, i.e., the first supporting planes 211, the second supporting planes 212, the third supporting planes 213, and the fourth supporting planes 214. Similarly, the second bracket 22 has four supporting planes corresponding to the first supporting planes 211, the second supporting planes 212, the third supporting planes 213, and the fourth supporting planes 214 for supporting computer drives 100, 200, 300, 400 respectively.

Please refer to FIGS. 3 and 4; the first bracket 21 further has a plurality of lines of installation holes thereon, i.e., the first installation holes 231, the second installation holes 232, the third installation holes 233, and the fourth installation holes 234 and the positions of the installation holes are corresponding to the position of the supporting planes 211, 212, 213, 214 respectively. The first fixing mechanism 31, the second fixing mechanism 32, the third fixing mechanism 33, and the fourth fixing mechanism 34 are respectively assembled with the first installation holes 231, the second installation holes 232, the third installation holes 233, and the fourth installation holes 234 so that the first fixing mechanism 31, the second fixing mechanism 32, the third fixing mechanism 33, and the fourth fixing mechanism 34 connects to the inner surface of the first bracket 21.

Figure 7:
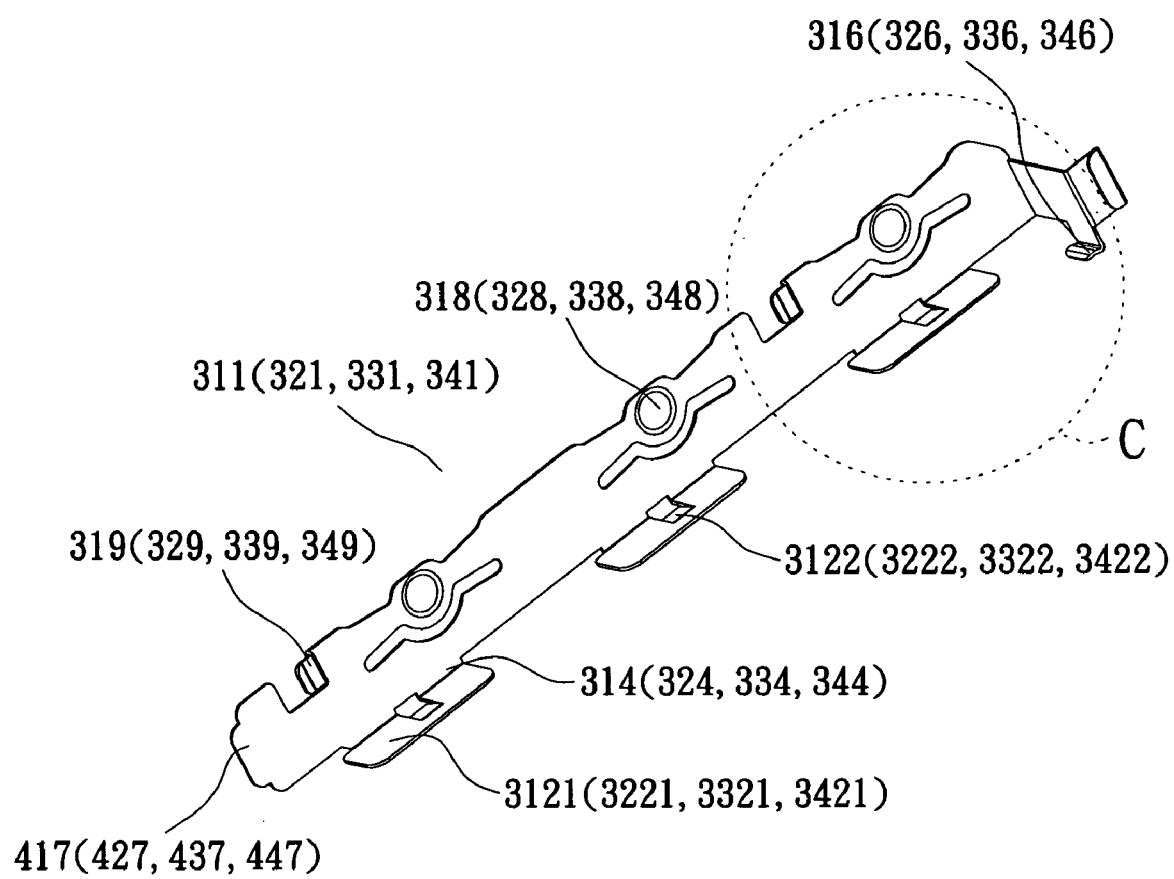
FIG. 7 is a schematic view showing the structure of the fixing mechanism and the view angle of FIG. 7 is reverse to that of FIG. 2
Figure 8:
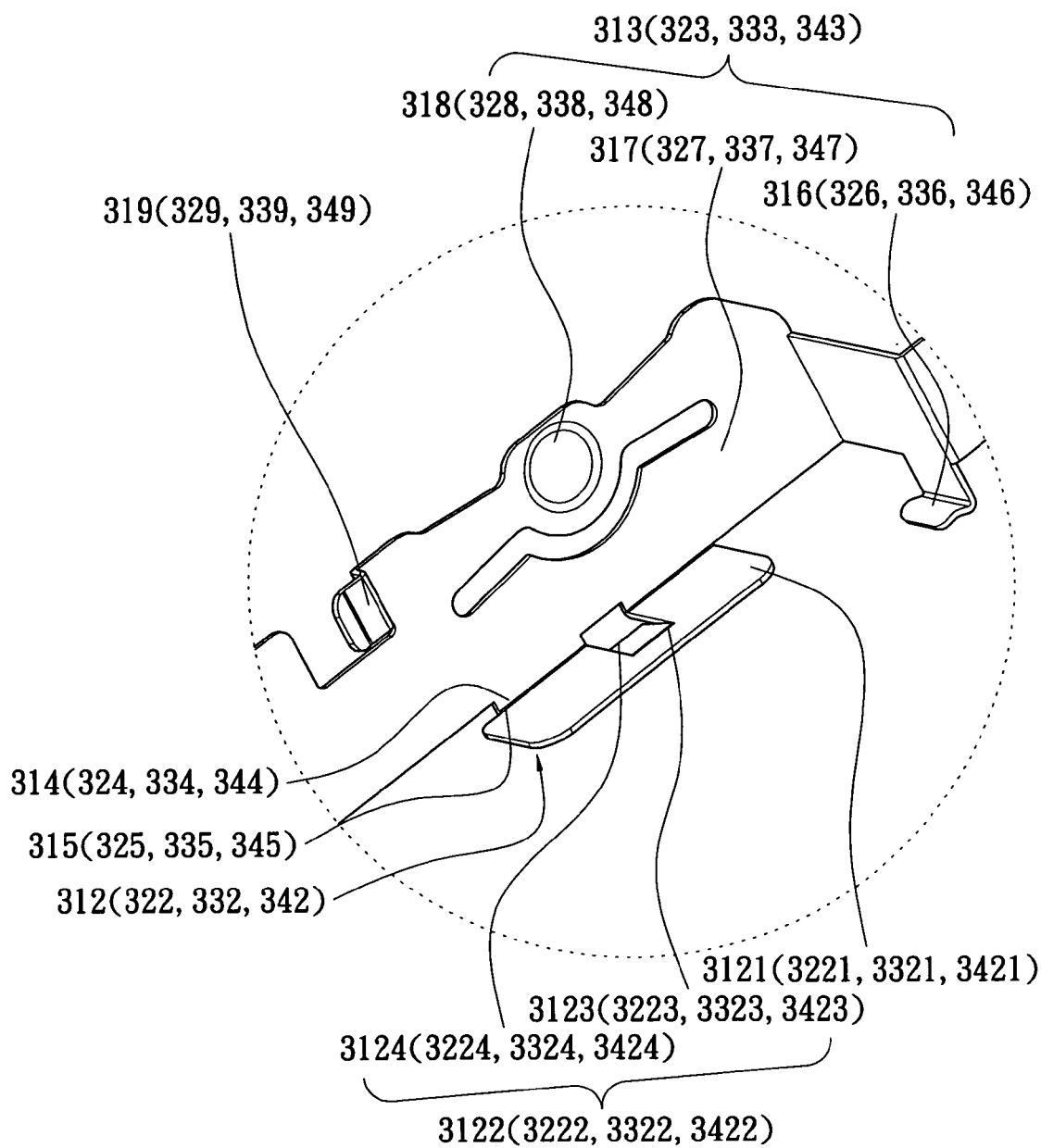
FIG. 8 is an enlarged representation showing the C portion of FIG. 7 according to the present invention.
Figure 11:
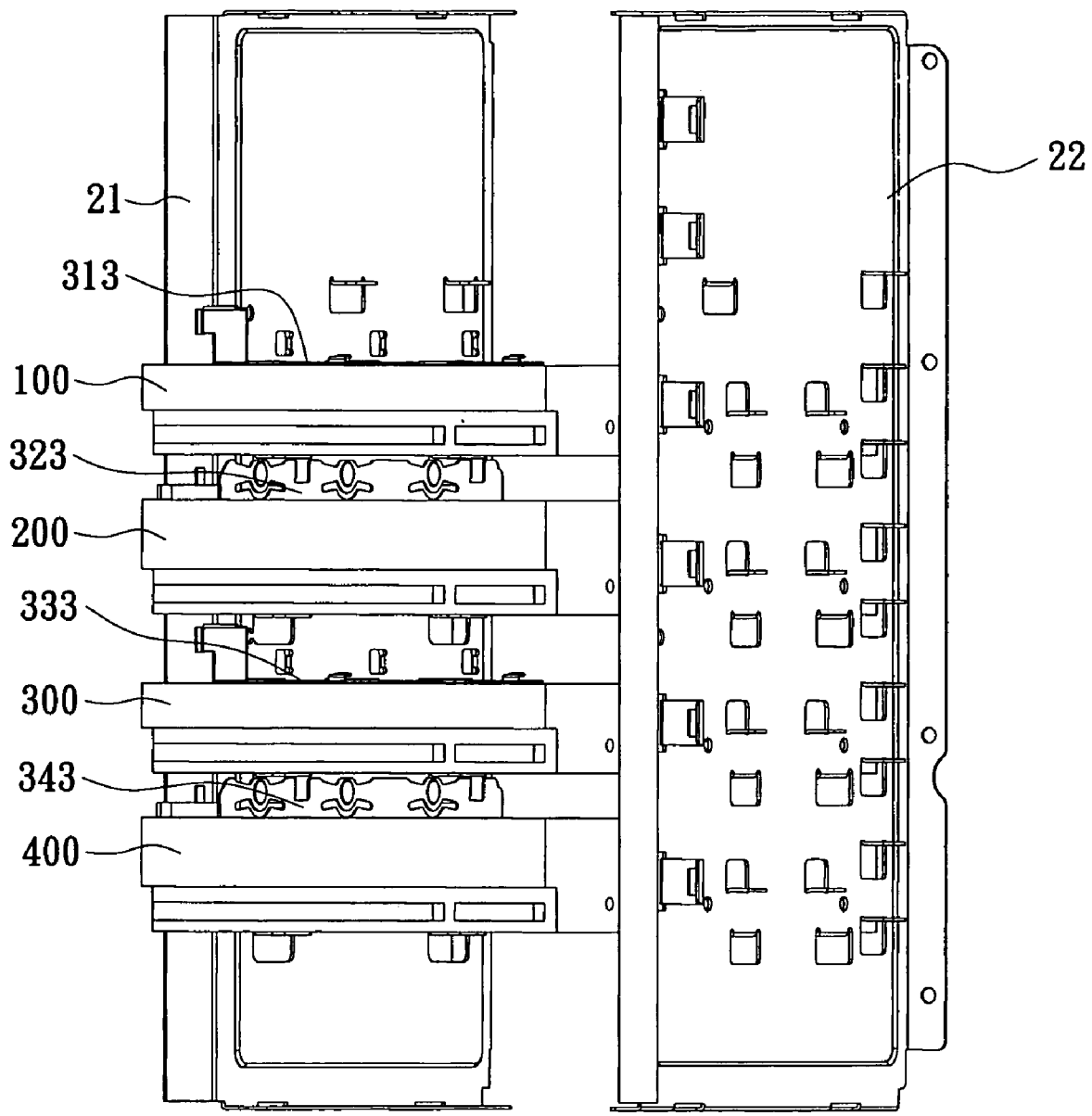
FIG. 11 shows the first bracket and the fixing mechanism for carrying the hard disk drives.

Please refer to FIGS. 7 and 8; the first fixing mechanism 31 has a first main portion 311, and the first main portion 311 has a first connecting portion 312. A plurality of the first installation pieces 3121 respectively bends and extends from the first connecting portion 312 and each first installation pieces 3121 is a rigid element. In the embodiment, the first connecting portion 312 has three first installation pieces 3121 spaced from each other. Furthermore, the first main portion 311 has at least one first restriction portion 313 which has a first restriction plane 317 thereon. At least one first elastic locking element 318 protrudes from the first restriction plane 317 so as to contact and hold the hard disk drive 100 (see FIG. 1). There is a first switching portion 314 disposed between the first restriction portion 313 and the first connecting portion 312, and the first switching portion 314 includes a first switching axis 315. Each first installation piece 3121 has a first elastic locking element 3122 and the first elastic locking element 3122 has a first connection end 3123 and a first free end 3124. The first connection end 3123 connects with the first installation piece 3121 and the first free end 3124 extends from the first connection end 3123 for protruding out of the first installation piece 3121.

At least one first fixing piece 319 protrudes from the first restriction plane 317 so that there are space between the first fixing piece 319 and the first restriction plane 317. Thus, the space is used for locking the fixing mechanism onto the bracket; in the embodiment, the space is used for locking the first fixing mechanism 31 onto the first bracket 21

The first restriction portion 313 disposed nearest to one end of the first fixing mechanism 31 has a first location hook 316 on that end. The first restriction portion 313 nearest to the other end of the first fixing mechanism 31 has a first insertion piece 417 which is a rigid element with plated shape.

Similarly, the second fixing mechanism 32 is essentially the same as the first fixing mechanism 31. In detail, the second fixing mechanism 32 has a second main portion 321 and the second main portion 321 has a second connecting portion 322. A plurality of the second installation pieces 3221 respectively bends and extends from the second connecting portion 322 and each second installation pieces 3221 is a rigid element. In the embodiment, the second connecting portion 322 has three second installation pieces 3221 spaced from each other. Furthermore, the second main portion 321 has at least one second restriction portion 323 which has a second restriction plane 327 thereon. At least one second elastic locking element 328 protrudes from the second restriction plane 327 so as to contact and hold the hard disk drive 200 (see FIG. 1). Please refer to FIGS. 7 and 8; there is a second switching portion 324 disposed between the second restriction portion 323 and the second connecting portion 322, and the second switching portion 324 includes a second switching axis 325. Each second installation piece 3221 has a second elastic locking element 3222, and the second elastic locking element 3222 has a second connection end 3223 and a second free end 3224. The second connection end 3223 connects with the second installation piece 3221, and the second free end 3224 extends from the second connection end 3223 for protruding out of the second installation piece 3221.

At least one second fixing piece 329 protrudes from the second restriction plane 327 so that there are space between the second fixing piece 329 and the second restriction plane 327. Thus, the space is used for locking the fixing mechanism onto the bracket; in the embodiment, the space is used for locking the second fixing mechanism 32 onto the first bracket 21

The second restriction portion 323 disposed nearest to one end of the second fixing mechanism 32 has a second location hook 326 on that end. The second restriction portion 323 disposed nearest to the other end of the second fixing mechanism 32 has a second insertion piece 427 which is a rigid element with plated shape.

The third fixing mechanism 33 has a third main portion 331, and the third main portion 331 has a third connecting portion 332. A plurality of the third installation pieces 3321 respectively bends and extends from the third connecting portion 332 and each third installation pieces 3321 is a rigid element. In the embodiment, the third connecting portion 332 has three third installation pieces 3321 spaced from each other. Furthermore, the third main portion 331 has at least one third restriction portion 333 which has a third restriction plane 337 thereon. At least one third elastic locking element 338 protrudes from the third restriction plane 337 so as to contact and hold the hard disk drive 300 (see FIG. 1). Please refer to FIGS. 7 and 8; there is a third switching portion 334 disposed between the third restriction portion 333 and the third connecting portion 332, and the third switching portion 334 includes a third switching axis 335. Each third installation piece 3321 has a third elastic locking element 3322, and the third elastic locking element 3322 has a third connection end 3323 and a third free end 3324. The third connection end 3323 connects with the third installation piece 3321, and the third free end 3324 extends from the third connection end 3323 for protruding out of the third installation piece 3321.

At least one third fixing piece 339 protrudes from the third restriction plane 337 so that there are space between the third fixing piece 339 and the third restriction plane 337. Thus, the space is used for locking the fixing mechanism onto the bracket; in the embodiment, the space is used for locking the third fixing mechanism 33 onto the first bracket 21.

The third restriction portion 333 disposed nearest to one end of the third fixing mechanism 33 has a third location hook 336 on that end. The third restriction portion 333 disposed nearest to the other end of the third fixing mechanism 33 has a third insertion piece 437 which is a rigid element with plated shape.

The fourth fixing mechanism 34 has a fourth main portion 341, and the fourth main portion 341 has a fourth connecting portion 342. A plurality of the fourth installation pieces 3421 respectively bends and extends from the fourth connecting portion 342, and each fourth installation pieces 3421 is a rigid element. In the embodiment, the fourth connecting portion 342 has three fourth installation pieces 3421 spaced from each other. Furthermore, the fourth main portion 341 has at least one fourth restriction portion 343 which has a fourth restriction plane 347 thereon. At least one fourth elastic locking element 348 protrudes from the fourth restriction plane 347 so as to contact and hold the hard disk drive 400 (see FIG. 1). Please refer to FIGS. 7 and 8; there is a fourth switching portion 344 disposed between the fourth restriction portion 343 and the fourth connecting portion 342, and the fourth switching portion 344 includes a fourth switching axis 345. Each fourth installation piece 3421 has a fourth elastic locking element 3422, and the fourth elastic locking element 3422 has a fourth connection end 3423 and a fourth free end 3424. The fourth connection end 3423 connects with the fourth installation piece 3421, and the fourth free end 3424 extends from the fourth connection end 3423 for protruding out of the fourth installation piece 3421.

At least one fourth fixing piece 349 protrudes from the fourth restriction plane 347 so that there are space between the fourth fixing piece 349 and the fourth restriction plane 347. Thus, the space is used for locking the fixing mechanism onto the bracket; in the embodiment, the space is used for locking the fourth fixing mechanism 34 onto the first bracket 21.

The fourth restriction portion 343 disposed nearest to one end of the fourth fixing mechanism 34 has a fourth location hook 346 on that end. The fourth restriction portion 343 disposed nearest to the other end of the fourth fixing mechanism 34 has a fourth insertion piece 447 which is a rigid element with plated shape.

The first bracket 21 has the first installation holes 231, the second installation holes 232, the third installation holes 233, and the fourth installation holes 234. The numbers and the positions of the installation holes corresponds to the numbers and the positions of the installation pieces; in the embodiment, installation holes 231, 232, 233, 234 corresponds to installation pieces 3121, 3221, 3321, 3421.

Please refer to FIGS. 2 and 3. A first elastic clamping element 241 protrudes from the outer surface of the first bracket 21 above the position of each first installation holes 231. There is space formed between the first elastic clamping element 241 and the outer surface of the first bracket 31 so that the first fixing mechanism 31 can be fixed onto the first bracket 21 by the elastic clamping element 241. Similarly, the second elastic clamping elements 242, the third elastic clamping elements 243, and the fourth elastic clamping elements 244 are respectively formed adjacently to the second installation holes 232, the third installation holes 233, and the fourth installation holes 234 so that the elastic clamping elements 241, 242, 243, 244 perform as fixing portions for fixing the second fixing mechanism 32, the third fixing mechanism 33, and the fourth fixing mechanism 34 on the first bracket 21.

The first bracket 21 has a plurality of first fixing holes 219, the second fixing holes 229, the third fixing holes 239, and the fourth fixing holes 249 in which the first fixing pieces 319, the second fixing pieces 329, the third fixing pieces 339, and the fourth fixing pieces 349 are respectively inserted. The fixing mechanism 31, 32, 33, 34 is fixed on the first bracket 21 by the connection of the fixing pieces 319, 329, 339, 349 and the fixing holes 219, 229, 239, 249. Furthermore, the first bracket 21 has a first longitude location hooking hole 217, a first transverse location hooking hole 218, a second longitude location hooking hole 227, a second transverse location hooking hole 228, a third longitude location hooking hole 237, a third transverse location hooking hole 238, a fourth longitude location hooking hole 247, and a fourth transverse location hooking hole 248. The pair of the first hooking holes 217, 218 corresponds to the first location hook 316, and the second pair 227, 288, third pair 237, 238, and fourth pair 247, 248 of the hooking holes accordingly corresponds to the second, third, and fourth location hook 326, 336, 346.

Figure 5:
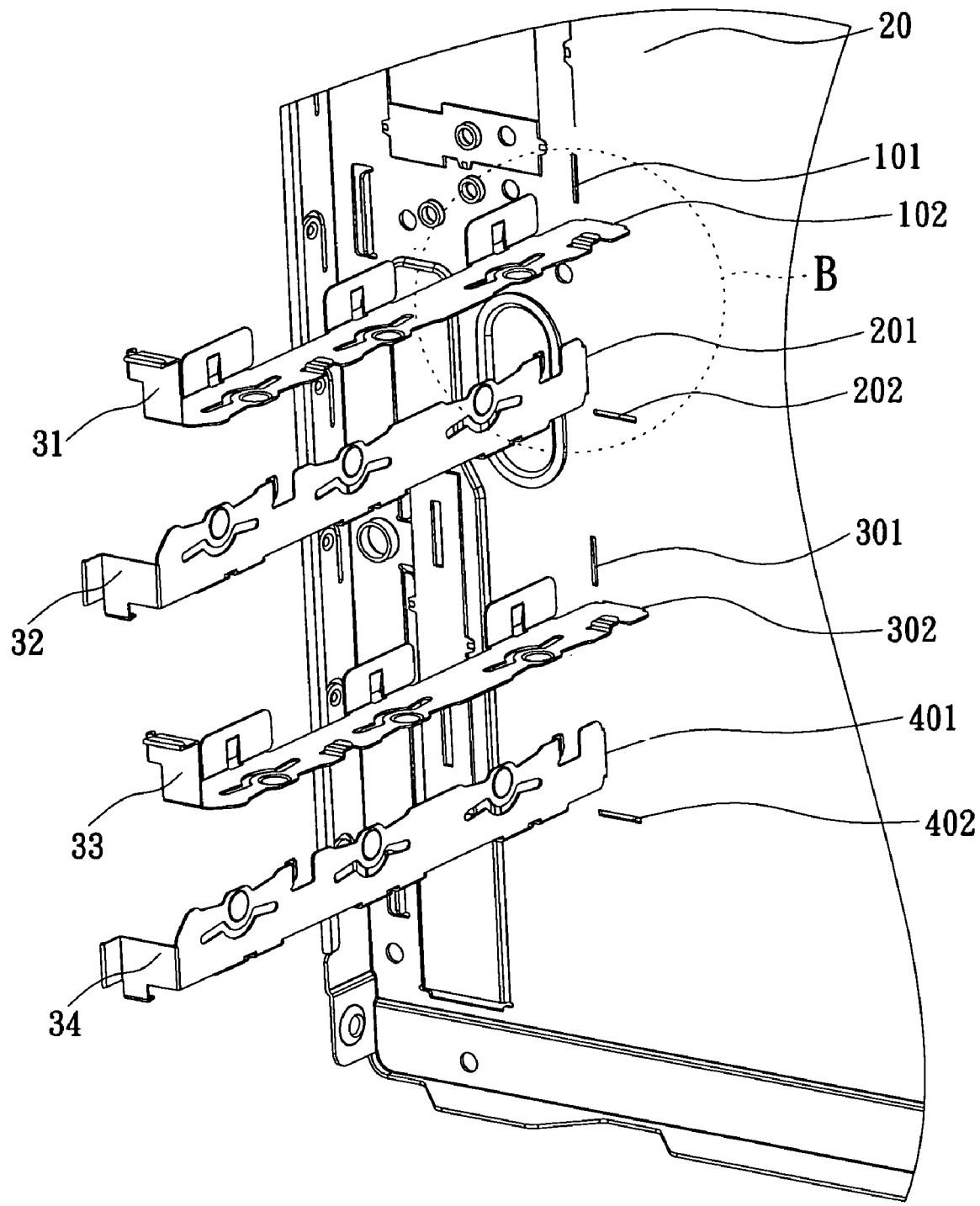
FIG. 5 is a schematic view showing the fixing mechanism assembled with the covering member according to the present invention.
Figure 6:
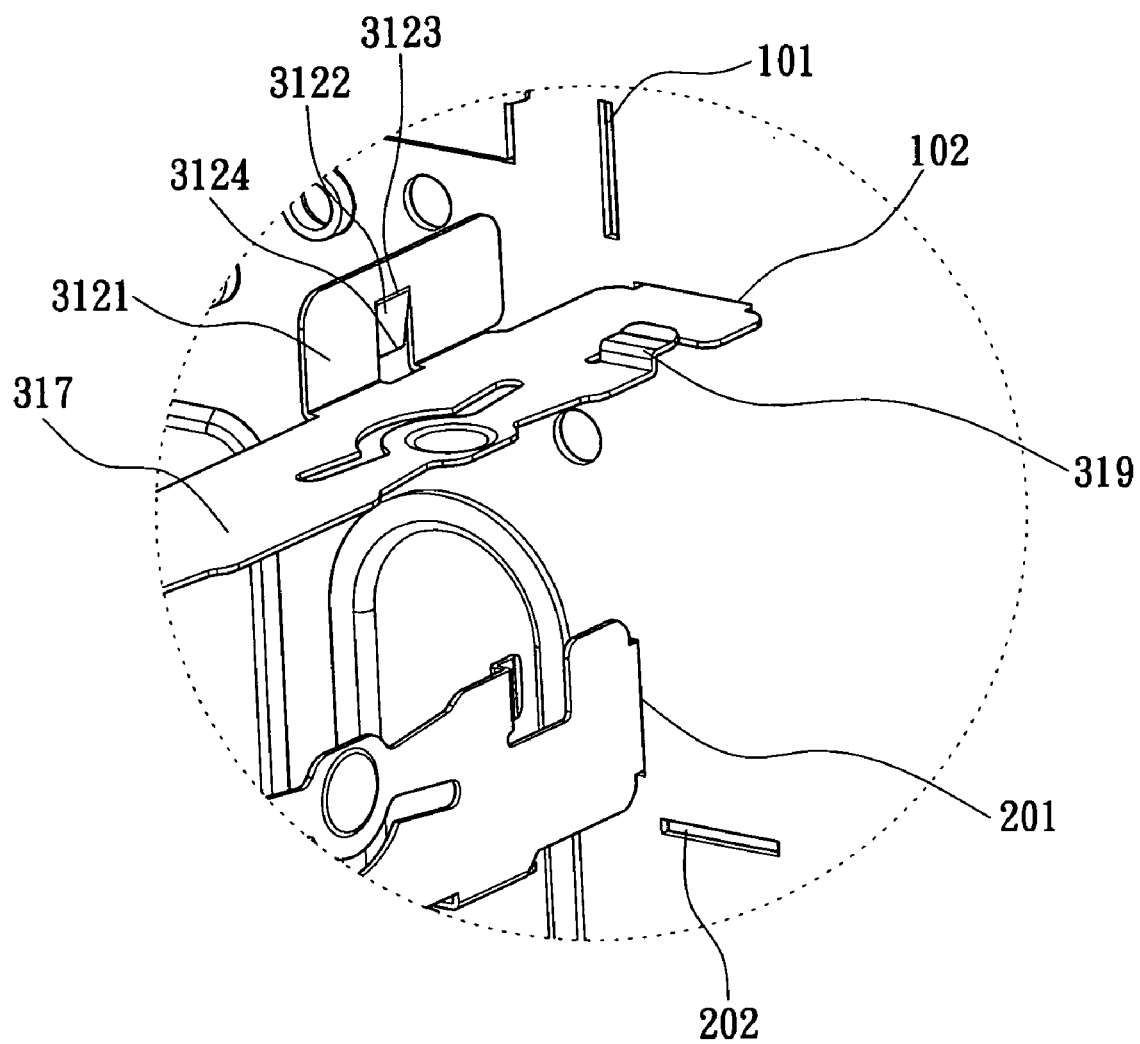
FIG. 6 is an enlarged representation showing the B portion of FIG. 5 according to the present invention.

Please refer to FIGS. 5 and 6. The covering member 20 has a first longitude strengthening insertion hole 101, a first transverse strengthening insertion hole 102, a second longitude strengthening insertion hole 201, a second transverse strengthening insertion hole 202, a third longitude strengthening insertion hole 301, a third transverse strengthening insertion hole 302, a fourth longitude strengthening insertion hole 401, and a fourth transverse strengthening insertion hole 402.

The fixing mechanism 31, 32, 33, 34 is used for supporting the hard disk drives 100, 200, 300, 400 with different height, as it will be better described hereinafter.

Please refer to FIGS. 1-11; four hard disk drives 100, 200, 300, 400 are accommodated in the computer casing. The first and the third hard disk drives 100, 300 have smaller/shorter height (first height) and the second and the fourth hard disk drives 200, 400 have longer/taller height (second height).

The above-mentioned fixing mechanisms (i.e. 31-34) have the same structure, and the fixing mechanisms 31, 32, 33, 34 can switch from a first position to a second position so as to carry the hard disk drives 100, 200, 300, 400 with different heights. For example, when a hard disk drive 100, 300 with the first size is accommodated in the casing, the fixing mechanisms 31, 32, 33, 34 are used for compensating the difference between the first and the second heights. In other words, the computer casing accommodates hard disk drives 100, 200, 300, 400 with different heights by efficiently switching (rotating) the fixing mechanisms 31, 32, 33, 34 without any screw. Therefore, users can put the hard disk drivers 100, 200, 300, 400 into the computer casing easily even if the hard disk drives 100, 200, 300, 400 have different heights.

The first hard disk drive 100, the second hard drive 200, the third hard disk drive 300, and the fourth hard disk drive 400 are respectively carried on the first supporting plane 221, the second supporting plane 222, the third supporting plane 223, and the fourth supporting plane 224.

The number and the position of the first installation hole 231 correspond to the number and the position of the first installation piece 3121. The first installation pieces 3121 are inserted into the corresponding first installation holes 231, and first installation pieces 3121 penetrate through the first installation holes 231 so as to contact the outer surface of the first bracket 21. There is a first elastic clamping element 241 protruding from the outer surface of the first bracket 21, and the first elastic clamping element 241 is disposed on an side of each first installation hole 231. The first elastic clamping elements 241 are used for fixing the first installation pieces 3121 so that the first fixing mechanism 31 can be assembled with the first bracket 21. At this moment, the first restriction portions 313 are perpendicular to the first bracket 21 (i.e. in a horizontal state) and the horizontal state of the first restriction portions 313 is defined as a first position of the first restriction portions 313.

Please refer to FIGS. 2-3, 9-11; a first location hook 316 extends from the first restriction portions 313 on one end of the first fixing mechanism 31 and it is inserted and locked into the first longitude location hooking hole 217 for providing the connecting strength between the first fixing mechanism 31 and the first bracket 21.

Please refer to FIGS. 5, 6, and 7; a first insertion piece 417 connects to the first restriction portions 313 on the other end of the first fixing mechanism 31. The first insertion piece 417 is inserted and locked into the first transverse strengthening insertion hole 102 for preventing the bending of the other end of the first fixing mechanism 31 when the first fixing mechanism 31 is forced on. In other words, the strengthening insertion holes 101, 102 201, 202, 301, 302, 401, 402 perform as strengthening portions for protecting the fixing mechanisms 31, 32, 33, 34 from bending; in particular, while in the first position, the transverse strengthening insertion holes 102, 202, 303, 402 each performs as a strengthening portion.

Now, a hard disk drive can be accommodated in the casing. Because that the first restriction portions 313 is in the first position (horizontal state), the height of the hard disk drive is limited by the first restriction portions 313. Therefore, the first hard disk drive 100 of smaller height can be put into the space between the first restriction portions 313 and the first supporting planes 221. The first restriction plane 317 of the first restriction portion 313 contacts the accommodated hard disk drive 100, and the first elastic locking elements 318 protruding from the first restriction portion 313 provide elastic stress on the first hard disk drive 100 for tightly holding the hard disk drive 100.

The third fixing mechanisms 33 are used for fixing the third hard disk drive 300 in the same way with the first mechanisms 31.

The second installation pieces 3221 of the second fixing mechanism 32 insert into the second installation holes 232. Simultaneously, the second elastic locking elements 3222 are lowed to pass through the second installation holes 232. After passing through the second installation holes 232, the second elastic locking elements 3222 elastically revert to the original state so that the second elastic locking elements 3222 are fixed on the first bracket 21. Therefore, the second fixing mechanism 32 can be fixed onto the first bracket 21. The second fixing piece 329 protruding from the second restriction plane 327 inserts into the second fixing hole 229 so as to fix the second fixing piece 329 onto the first bracket 21. The second restriction portion 323 of the second fixing mechanism 32 keeps to the first bracket 21 in parallel. In other words, the second restriction portion 323 is in a vertical state for releasing/adjusting the height limitation. The vertical state of the restriction portion is defined as the second position of the fixing mechanism; in this embodiment, the vertical state of the second restriction portion 323 indicates the second fixing mechanism 32 is in the second position For improving the connection between the second fixing mechanism 32 and the first bracket 21, the second location hook 326 extends from the second restriction portions 323 on one end of the second fixing mechanism 32 and it is inserted and locked into the second transverse location hooking hole 228 for providing the connecting strength between the second fixing mechanism 32 and the first bracket 21.

Please refer to FIG. 5 in conjunction with FIGS. 7 and 8; a second insertion piece 427 connects to the second restriction portions 323 on the other end of the second fixing mechanism 32. The second insertion piece 427 is inserted and locked into the second longitude strengthening insertion hole 201 for preventing the bending of the other end of the second fixing mechanism 32 when the second fixing mechanism 32 is forced on. In other words, the strengthening insertion holes 101, 102, 201, 202, 301, 302, 401, 402 perform as strengthening portions for protecting the fixing mechanisms 31, 32, 33, 34 from bending; in particular, while in the second position, the longitude strengthening insertion holes 101, 201, 301, 401 each performs as a strengthening portion.

After assembling the second fixing mechanism 32, a hard disk drive can be accommodated in the casing. Because that the second restriction portions 323 is in the second position (vertical state), the height of the hard disk drive does not be limited by the second restriction portions 323. Therefore, the hard disk drive 200 of higher/taller height can be put into the space between the second restriction portions 323 and the second supporting planes 212. The second restriction plane 327 of the second restriction portion 323 contacts the accommodated second hard disk drive 200, and the second elastic locking elements 328 protruding from the second restriction plane 327 provide elastic stress on the second hard disk drive 200 for tightly holding the hard disk drive 200.

The fourth fixing mechanisms 34 are used for fixing the fourth hard disk, drive 400 in the same way with the second mechanisms 32.

In the original position, the first and the third fixing mechanisms 31, 33 are connected on the first bracket 21 by inserting the first and the third installation pieces 3121, 3321 into the first and the third installation holes 231, 233. When a user wants to change the smaller/shorter disk drive to bigger/taller disk drive into the casing, the first fixing mechanism 31 can be rotated counterclockwise via the first switching axis 315 of the first switching portion 314 for switching (rotating) the first restriction portions 313. Similarly, the third fixing mechanism 33 can be rotated counterclockwise via the third switching axis 335 of the third switching portion 334 for switching (rotating) the third restriction portions 333. Therefore, the space limited by the first restriction portions 313 or the third restriction portions 333 can be released/adjusted for accommodating the higher/taller hard disk drive. On the other hand, the second restriction portion 323 or the fourth restriction portion 343 can be rotated clockwise from the second position (horizontal state) to the first position (vertical state) for limiting the height of the hard disk drives. Accordingly, the users can adjust the position of the restriction portions 313, 323, 333, 343 of the fixing mechanism 31, 32, 33, 34 depending on the height of the hard disk drives.

Even if the four disk drives 100, 200, 300, 400 have the same height, the computer casing with the fixing mechanism of the present invention can be applied for supporting the disk drives 100, 200, 300, 400 steady.

Moreover, the fixing mechanisms 31, 32, 33, 34 can be used for accommodating another type of computer hardware.

Even though the present invention has been described with reference to the foregoing preferred embodiment, it shall be understood that the present invention is not limited to the details thereof. Various equivalent variations and modifications may occur to those skilled in this art in view of the teachings of the present invention. Thus, all such variations and equivalent modifications are also embraced within the scope of the present invention as defined in the appended claims.

What is claimed is:

1. A fixing member of one-piece construction for assembly on a mounting bracket of a computer casing, the one-piece fixing member comprising:
    a main portion, having a location hook and a insertion piece on two ends thereof, and the location hook selectively connecting in a first position to a longitude location hooking hole and in a second position to a transverse location hooking hole formed on the mounting bracket;
    a connecting portion disposed on the main portion, the connecting portion movably connecting to the bracket, wherein the connecting portion has at least one installation piece bent form one edge of the main portion;
    at least one restriction portion, connecting with the connecting portion, the restriction portion having a restriction plate and an elastic locking element; and
    a switching portion extending between the connecting portion and the restriction portion;
    the restriction portion being angularly displaced from the first position to the second position pivotally about via the switching portion for supporting hard disk drives with different heights.

2. The fixing member according to claim 1, wherein the switching portion has a switching axis and the restriction portion rotates via the switching axis for supporting hard disk drives with different heights.

3. The fixing member according to claim 1, wherein the restriction portion has a fixing piece protruded from the restriction plane and the fixing piece is assembled to one bracket for fixing the fixing member onto the bracket.

4. The fixing member according to claim 3, wherein the fixing piece is an elastic fixing piece protruded from the restriction plane of the restriction portion and the elastic fixing piece is assembled to one bracket for fixing the fixing member onto the bracket at the second position.

5. The fixing member according to claim 1, wherein the restriction portion disposed nearest to one end of the fixing member connects to the location hook for hooking the fixing member onto the bracket.

6. The fixing member according to claim 1, wherein the restriction portion nearest to the other end of the fixing member connects to the insertion piece and the insertion piece is a rigid element.

7. The fixing member according to claim 1, wherein the installation piece is a rigid element.

8. The fixing member according to claim 7, wherein the installation piece has an elastic locking element.

9. The fixing member according to claim 8, wherein the elastic locking element has a connection end and a free end, the connection end connects with the installation piece, and the free end extends from the connection end for protruding out of the installation piece.

10. The fixing member according to claim 1, wherein the elastic locking element contacts the hard disk drive for tightly forcing the hard disk drive.

11. A computer casing for supporting at least one hard disk drive, comprising:
    at least two brackets, respectively disposed on two sides of the hard disk drive, wherein each bracket has a plurality of supporting planes for supporting the hard disk drive;
    a plurality of fixing members of one-piece construction detachably disposed on inner surfaces of the two brackets in first and second alternative positions, wherein each fixing member comprises:
    a main portion, having a location hook and a insertion piece on two ends thereof, and the location hook selectively connecting in the first position to a longitude location hooking hole and in the second position to a transverse location hooking hole formed on the mounting bracket;
    a connecting portion disposed on the main portion, the connecting portion movably connecting to the corresponding bracket, wherein the connecting portion has at least one installation pieces bent form one edge of the main portion;
    at least one restriction portion connecting with the connecting portion, the restriction portion having a restriction plate and an elastic locking element, wherein the restriction portion is used for restricting the height of the hard disk drive; and
    a switching portion extending between the connecting portion and the restriction portion, the restriction portion being angularly displaced from the first position to the second position pivotally about via the switching portion for supporting hard disk drives with different heights.

12. The computer casing according to claim 11, wherein each bracket has at least one installation hole, and the installation piece of the connecting portion of the fixing member inserts into the installation hole.

13. The computer casing according to claim 12, wherein each bracket has a fixing portion respectively formed adjacently to the installation hole for fixing the connecting portion inserted into the installation hole.

14. The computer casing according to claim 13, wherein the fixing portion is an elastic clamping element protruding from the bracket, and the connecting portion is fixed within a space between the elastic clamping element and the bracket.

15. The computer casing according to claim 11, wherein each bracket has a plurality of location hooking holes for securing the fixing members at the first or the second positions.

16. The computer casing according to claim 15, wherein the direction of the longitude location hooking hole extends vertically while the transverse location hooking hole extends horizontally.

17. The computer casing according to claim 16, wherein the restriction portion disposed nearest to one end of the fixing member connects to the location hook.

18. The computer casing according to claim 11, further comprising a covering member, wherein the brackets and the fixing members are vertically connected with the covering member, and the covering member has a strengthening portion.

19. The computer casing according to claim 18, wherein the strengthening portion includes two strengthening insertion holes and the direction of one strengthening insertion hole extends vertically while the other strengthening insertion hole extends horizontally.

20. The computer casing according to claim 19, wherein the restriction portion nearest to the other end of the fixing member connects to the insertion piece, and the insertion piece selectively connects to the two strengthening insertion holes.

* * * * *